(12) United States Patent
Makinson et al.

(10) Patent No.: US 7,210,226 B2
(45) Date of Patent: May 1, 2007

(54) METHOD OF MANUFACTURING AN IMPELLER

(75) Inventors: Ian Douglas Makinson, Auckland (NZ); Subbarao Potharaju, Auckland (NZ); Philip John Dickinson, Auckland (NZ)

(73) Assignee: Fisher & Paykel Healthcare Limited, Auckland (NZ)

( * ) Notice: Subject to any disclaimer, the term of this patent is extended or adjusted under 35 U.S.C. 154(b) by 424 days.

(21) Appl. No.: 10/735,800

(22) Filed: Dec. 12, 2003

(65) Prior Publication Data

US 2004/0123459 A1    Jul. 1, 2004

Related U.S. Application Data

(62) Division of application No. 10/261,614, filed on Sep. 30, 2002, now Pat. No. 6,881,033.

(51) Int. Cl.
*B21K 25/00* (2006.01)
*B23P 15/04* (2006.01)

(52) U.S. Cl. .............. 29/889.23; 29/407.01; 29/557; 29/558; 29/527.1; 416/3; 417/420; 417/423.12

(58) Field of Classification Search ......... 29/889.23, 29/407.01, 407.07, 557, 558, 527.1; 416/3, 416/10, 185, 170 R, 241 A, 245 R; 417/423.7, 417/360, 423.1, 420, 423.12; 415/10
See application file for complete search history.

(56) References Cited

U.S. PATENT DOCUMENTS 3,829,722 A    8/1974   Rosenthal, Jr. et al.
4,850,821 A    7/1989   Sakai
5,044,897 A    9/1991   Dorman
5,079,467 A    1/1992   Dorman
5,575,630 A   11/1996   Nakazawa et al.
5,591,017 A    1/1997   Dwyer
5,649,811 A    7/1997   Krol, Jr. et al.
5,683,231 A   11/1997   Nakazawa et al.
5,713,730 A    2/1998   Nose et al.
5,803,720 A    9/1998   Ohara et al.
6,033,183 A    3/2000   Genster
6,171,078 B1   1/2001   Schob
6,183,220 B1   2/2001   Ohara et al.
6,227,797 B1   5/2001   Watterson et al.
6,302,661 B1  10/2001   Khanwilkar et al.
6,443,715 B1   9/2002   Mayleben et al.
6,508,628 B2   1/2003   Amr
6,527,522 B2   3/2003   Chen
6,626,644 B2   9/2003   Ozaki
6,685,446 B2   2/2004   Marioni
6,689,315 B2 * 2/2004   Linker et al. ............... 422/45
2003/0012672 A1 * 1/2003 Sowa et al. ............... 418/151
2005/0278937 A1 * 12/2005 Du et al. .................... 29/598

FOREIGN PATENT DOCUMENTS

EP            583781        2/1994

* cited by examiner

*Primary Examiner*—David P. Bryant
*Assistant Examiner*—Sarang Afzali
(74) *Attorney, Agent, or Firm*—Trexler, Bushnell, Giangiorgi, Blackstone & Marr, Ltd (57) ABSTRACT

A method of manufacturing an impeller includes the steps of: (a) forming an impeller having a plastic disc body and magnetisable material distributed and encapsulated within the body; (b) testing the imbalance of the impeller; (c) removing plastic material from the impeller to compensate for the tested imbalance; and (d) magnetising the magnetisable material to have an annular array of alternating poles.

2 Claims, 11 Drawing Sheets

METHOD OF MANUFACTURING AN IMPELLER

This application is a divisional application of U.S. patent application Ser. No. 10/261,614, filed on Sep. 30, 2002 now U.S. Pat. No. 6,881,033 and entitled "Impeller".

BACKGROUND TO THE INVENTION

The present invention relates to fan impellers and methods of manufacturing and balancing impellers. In particular the present invention relates to improvements in the manufacture and balancing of impellers wherein the rotor body and impeller are integrally formed.

SUMMARY OF THE PRIOR ART

In traditional blower assemblies, an impeller is driven by a motor coupled to it. A disadvantage of these traditional blowers is the complexity due to the number of parts which need to be assembled and thus may contribute significantly to cost.

The assembly of rotors from a number of parts may also require the individual parts to be accurately formed and assembled, in order to reduce imbalance of the completed rotor product.

SUMMARY OF THE INVENTION

It is an object of the present invention to provide an impeller for a blower, which will at least go some way towards improving on the above or which will at least provide the industry with a useful choice.

Accordingly in a first aspect the present invention consists in an impeller including:

a plastic disc having an upper face and a lower face, an annular array of vanes spaced around the periphery of the disc and extending from said upper face, an axially located and aligned rotation support passing through said disc, and regions of permanently magnetisable material encapsulated within said plastic disc for the formation of an annular array of magnetic poles.

Preferably said magnetisable material comprises a ring of magnetisable material within said disc, said ring and said disc each having a common axis of symmetry.

Preferably said rotation support comprises a shaft passing through and extending from either side of said disc, said shaft having a common axis of symmetry of said disc and said ring.

Preferably said disc includes a hub portion spanning between an inner edge of said ring of magnetisable material and an outer surface of said shaft, and in said hub region, said upper face of said disc extends upward along the outer surface of said shaft.

Preferably said impeller may further include an annular plastic cap spanning amongst and connecting to upper faces of said array of vanes, and having a central opening there through.

Preferably said impeller may include an annular plastic cap spanning amongst and connecting with the tops of said annular array of vanes, and having a central opening there through above said hub portion of said disc, with an upper end of said shaft protruding into said central opening.

Preferably said vanes are integrally moulded with said cap, extending from a lower surface of said cap and having lower ends which contact and are secured with said upper base of said disc.

In a second aspect the present invention consists in a method of manufacturing an impeller comprising the steps of:

(a) forming an impeller having a plastic disc body and magnetisable material distributed and encapsulated within said body;

(b) testing the imbalance of said impeller;

(c) removing plastic material from said impeller to compensate for said tested imbalance;

(d) magnetising said magnetisable material to have an annular array of alternating poles.

Preferably said step of forming said impeller comprises the steps of:

(a)(i) locating a ring of magnetisable material in an injection mould, including centrally locating said ring by engaging an outer surface thereof at spaced locations around said surface;

(a)(ii) locating a shaft centrally within said mould, passing through said ring, such that said shaft and said ring have a common axis of rotational symmetry; and (a)(iii) injecting plastic into said mould to encapsulate said ring of magnetisable material and span between said ring and said shaft;

(a)(iv) extracting said impeller from said mould.

Preferably said impeller includes the additional steps of:

(a)(v) forming an annular plastic cap having a lower face and an array of impeller vanes distributed around and extending from said lower face; and (a)(vi) securing said cap to an upper face of said disc by connecting the free ends of said vanes to said upper face.

Preferably said step of testing for imbalance includes testing for static imbalance and dynamic imbalance, and said step of compensating for imbalance includes removing plastic material at at least two axially separated locations on the periphery of said disc.

Preferably said step of testing for imbalance includes testing for imbalance includes testing for static imbalance and dynamic imbalance, and said step of compensating for imbalance includes removing plastic material at at least one location on said disc and at least one location on said cap.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

DETAILED DESCRIPTION

Figure 1:
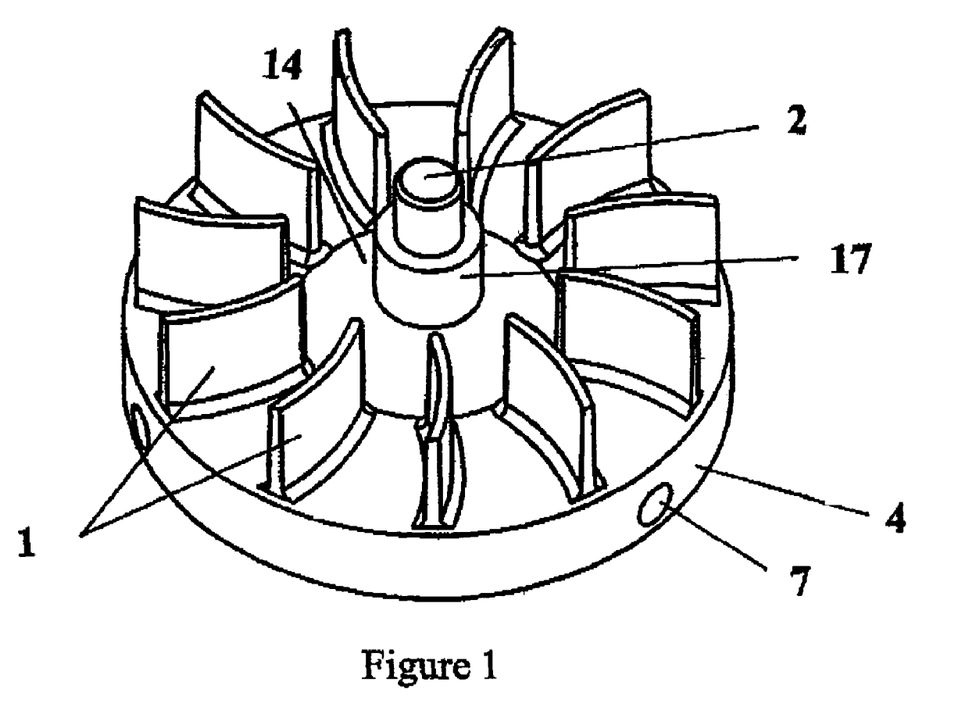
FIG. 1 is a perspective view of an encapsulated rotor according to a first embodiment of the present invention.
Figure 2:
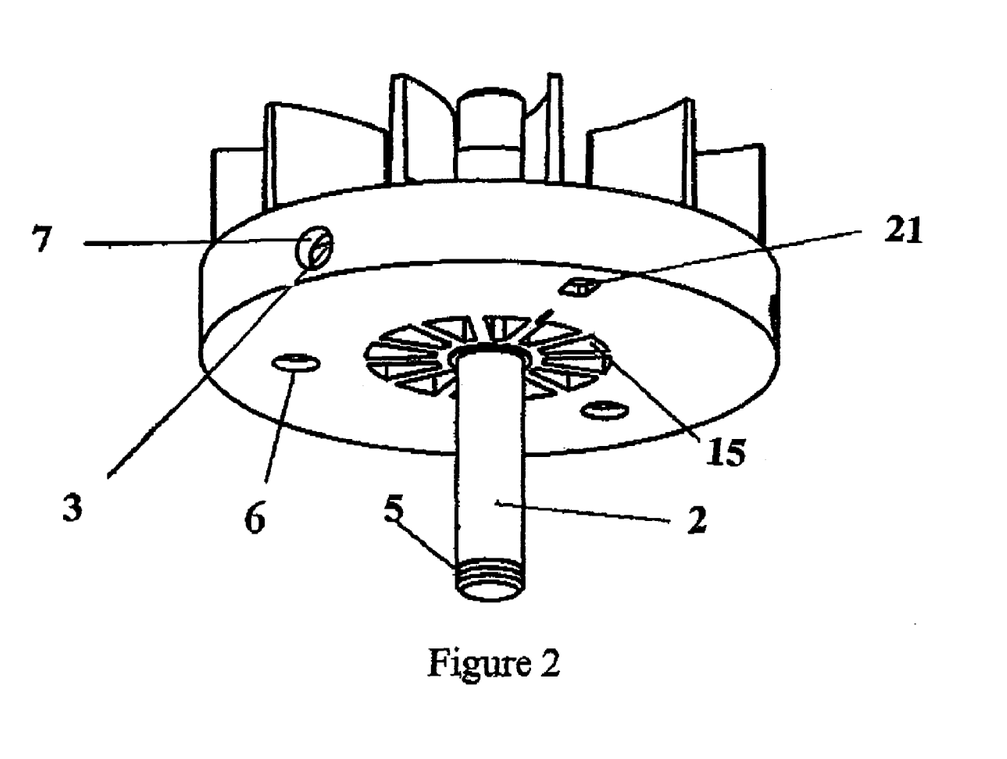
FIG. 2 is a perspective view of the rotor pictured in FIG. 1 showing the underside.
Figure 3:
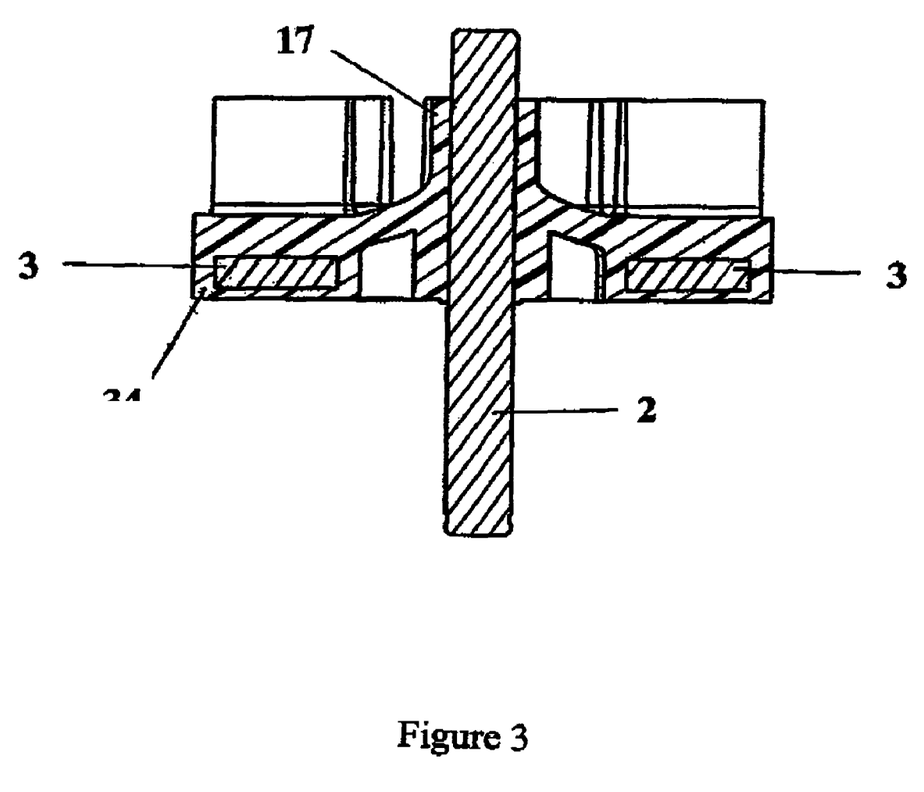
FIG. 3 is a mid transverse cross section view of the impeller shown in FIG. 1.

With reference to FIGS. 1 to 3 a first preferred embodiment of the present invention will be described. The present invention discloses an impeller having a plurality of impeller blades 1 moulded over the permanent magnets of an electric motor rotor. A shaft 2 is also integrally moulded into the rotor assembly during the manufacturing process. The rotor/impeller of the present invention is suitable for use in a pressurised gases supply device such as a CPAP blower. It is also envisaged that the rotor/impeller according to the present invention may provide advantages for any blower/fan application.

Figure 12:
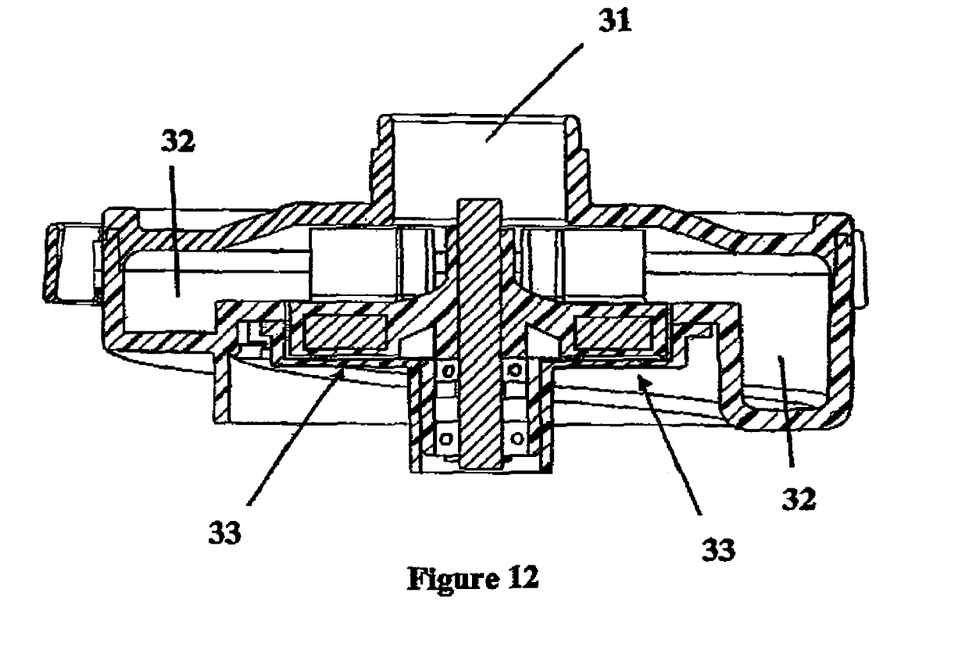
FIG. 12 is a cross-section view of an impeller according to the first preferred embodiment of the present invention installed in a blower housing.

FIG. 12 shows an impeller according to a first preferred embodiment of the present invention installed in a blower housing. Air enters through inlet port 31 where it is blown through the outlet volute 32. Arrows 33 show the position where a commutated stator goes in order to provide a torque to the rotor.

The resulting assembly is a compact, one piece combined rotor and impeller. The integral forming of the rotor and impeller allow for significant simplification of traditional designs and may lead to a more cost effective product.

The rotor 4 is generally disc shaped. A shaft 2 extends through the centre of the disc, protruding on both sides in a direction that is normal to the general plane of the disc, so that it is coaxial with the rotor 4. On one face of the disc a plurality of impeller vanes 1 is arranged in an annular array. The impeller vanes have a curved profile shaped in accordance with the performance requirements of the blower. The impeller is moulded over a magnetisable ring 3. The ring 3 is subsequently magnetised to become the permanent magnetic poles of the rotor. In use the poles interact with a commutated stator to provide a torque to the rotor/limpeller assembly.

Between the inner surface of the magnetisable ring 3 and the outer surface of the shaft 2 is a hub portion 14. The inner portion of the hub 14 extends upward along the outer surface of the shaft 2 forming a shoulder portion 17. The upperside of the hub 14 is a thin shell. The underside of the hub portion 14 is a plurality of annularly spaced ribs 15. Shaft 2 may include a groove 5 adapted to receive a circlip for the purpose of securing the rotor.

Performance of the encapsulated rotor will be detrimentally effected by any imbalance arising from asymmetry of the components about its axis of rotation. In traditional designs where the impeller is not integrally formed to include the permanent magnets of the rotor, the impeller will be comparatively lightweight. Consequently there is less potential for significant imbalance when the impeller is comparatively lighter. In an encapsulated rotor such as that described in the present invention the integral forming of the permanent magnets with the impeller blades dramatically increases the potential for significant rotational imbalance. Consequently it is advantageous for rotors formed according to the present invention to be as close as possible to being balanced once the overmoulding process has been completed. In order to achieve this the present invention precisely locates and maintains the position of the shaft and magnet(s) in the overmoulding process.

In this first preferred embodiment of the present invention the impeller is moulded over a one piece magnetisable ring 3. A small portion of the outer surface of magnetisable ring 3 is visible through aperture 7 in FIG. 2. The ring 3 is subsequently magnetised to have four poles.

Figure 7:
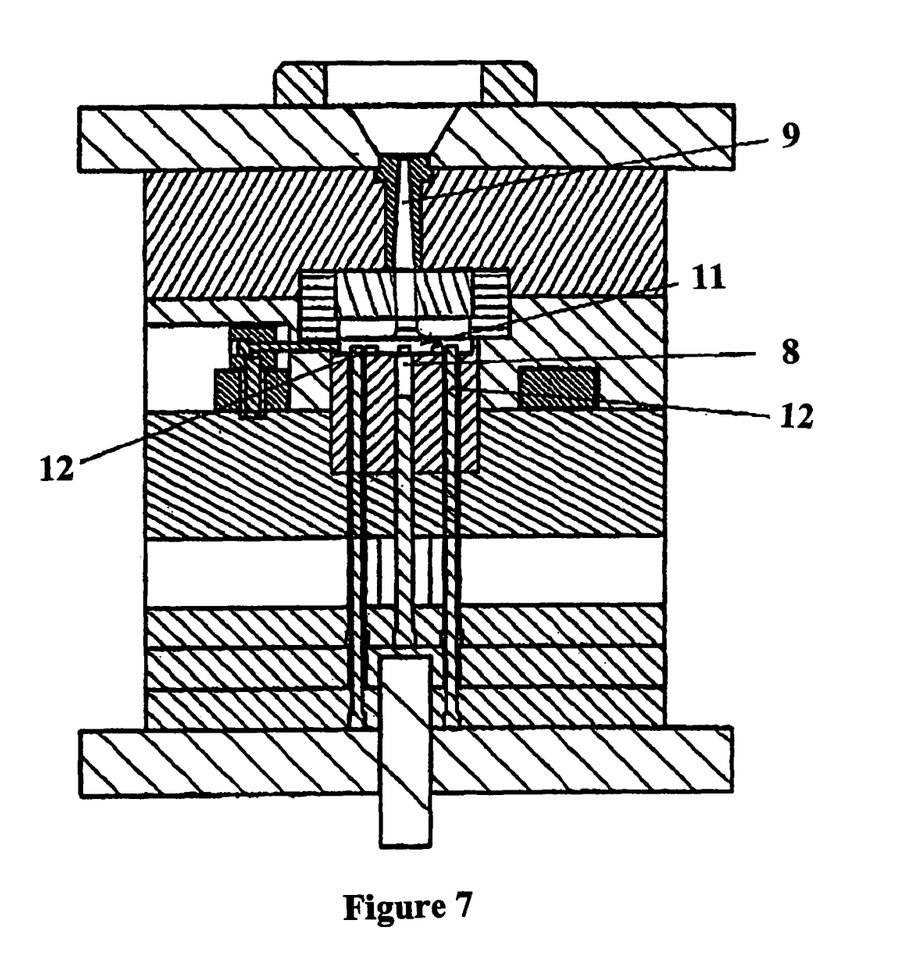
FIG. 7 is a cross section view of the mould apparatus used to overmould an encapsulated rotor according to the present invention.

With reference to FIG. 7, the ring 3 is inserted into the mould cavity against a plurality of upwardly projecting support rods 12. The rods support the ring 3 and hold it slightly off the bottom surface of the mould cavity thus allowing the injected molten polymer to flow around the ring encapsulating it from all sides. It is advantageous that the wall thickness of the encapsulating polymer on the bottom surface of the magnetisable ring 3 is as thin as practicable in order that the air gap between the ring 3 and the coils of the stator is small. The portion on the bottom surface of the ring 3 which is in contact with the plurality of supporting rods 12 will not be covered in plastic. This results in detents 6 in the finished product. A reference mark 21 is also produced in the finished product via a similar process that produces the detents 6. The reference mark is used later in the balancing process. It is a requirement that the reference mark 21 is distinguishable (by an optical sensor) from the detents 6. In the preferred embodiment of the present invention the reference mark 21 is distinguished from detents 6 by its shape and its position. Reference mark 21 is a slot and is positioned closer to the outer edge of the rotor body 4 than detents 6.

Figure 8:
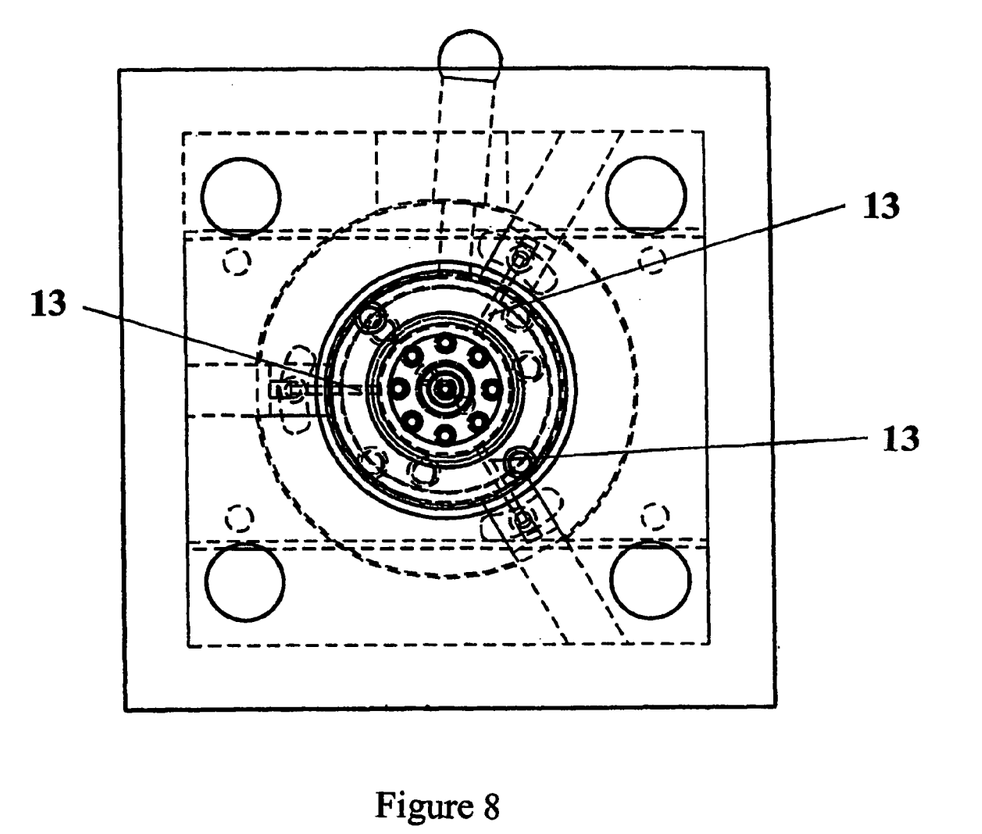
FIG. 8 is a plan view of the mould apparatus pictured in FIG. 7.

In order to align the magnetisable ring 3 coaxially with the mould cavity a number of alignment pins 13 are provided which extend into the mould cavity around the periphery and substantially perpendicular to the rods 12 as shown in FIG. 8. Alignment pins 13 are extendable and retractable in order to facilitate alignment of the magnetisable ring 3 and the extraction of the completed rotor product. In the preferred embodiment of the present invention there are three alignment pins 13 arranged in the horizontal plane, 120 degrees apart. The alignment pins contact the outer surface of ring 3, in order to provide coaxial alignment between the mould cavity and ring. The alignment pins 13 also allow molten plastic to flow around them encapsulating the rotor. In a similar manner to detents 6, the alignment rods form outer apertures 7 in the finished rotor product.

Provided in the lower platen of the mould, is a locating recess 8 for shaft 2. The shaft recess 8 is shaped and positioned such that it may receive and accurately locate the shaft 2 to be coaxial with the central axis of the mould cavity. Injection port 9 is conical and provides an opening into the mould cavity for the injection of molten plastic. The injection port cavity also forms a sprue on the finished product.

It is preferable to include a key for ensuring that rotation between the shaft 2 and the finished moulded impeller does not occur. To this end the shaft 2 is provided with at least one protrusion to engage with the moulding. In the preferred embodiment of the present invention a splined section 10 is provided on the shaft for this purpose.

During the manufacturing process an annular magnetisable ring 3 is inserted into the mould cavity 11 so that its bottom surface rests on and is supported by the plurality of rods 12. The alignment pins 13 are then extended so that they bear upon the outer surface of ring 3 aligning the ring to be coaxial with the central axis of the mould cavity. A shaft 2 is placed into shaft recess 8 which is also aligned with the central axis of the mould cavity. After the mould halves are closed and pressed together molten plastic is injected through injector port 9 until the mould cavity is filled. A sprue is formed in the injector cavity 9 and is later removed when the finished product has cooled.

In order to remove the finished impeller from the mould it is necessary to retract alignment pins 13 so that their inner ends are removed from the detents 7 of the finished product which allows the finished product to be displaced axially and removed from the mould. The support rods 12 are able to extend and retract so that they can be used to eject the finished product from the mould.

Figure 4:
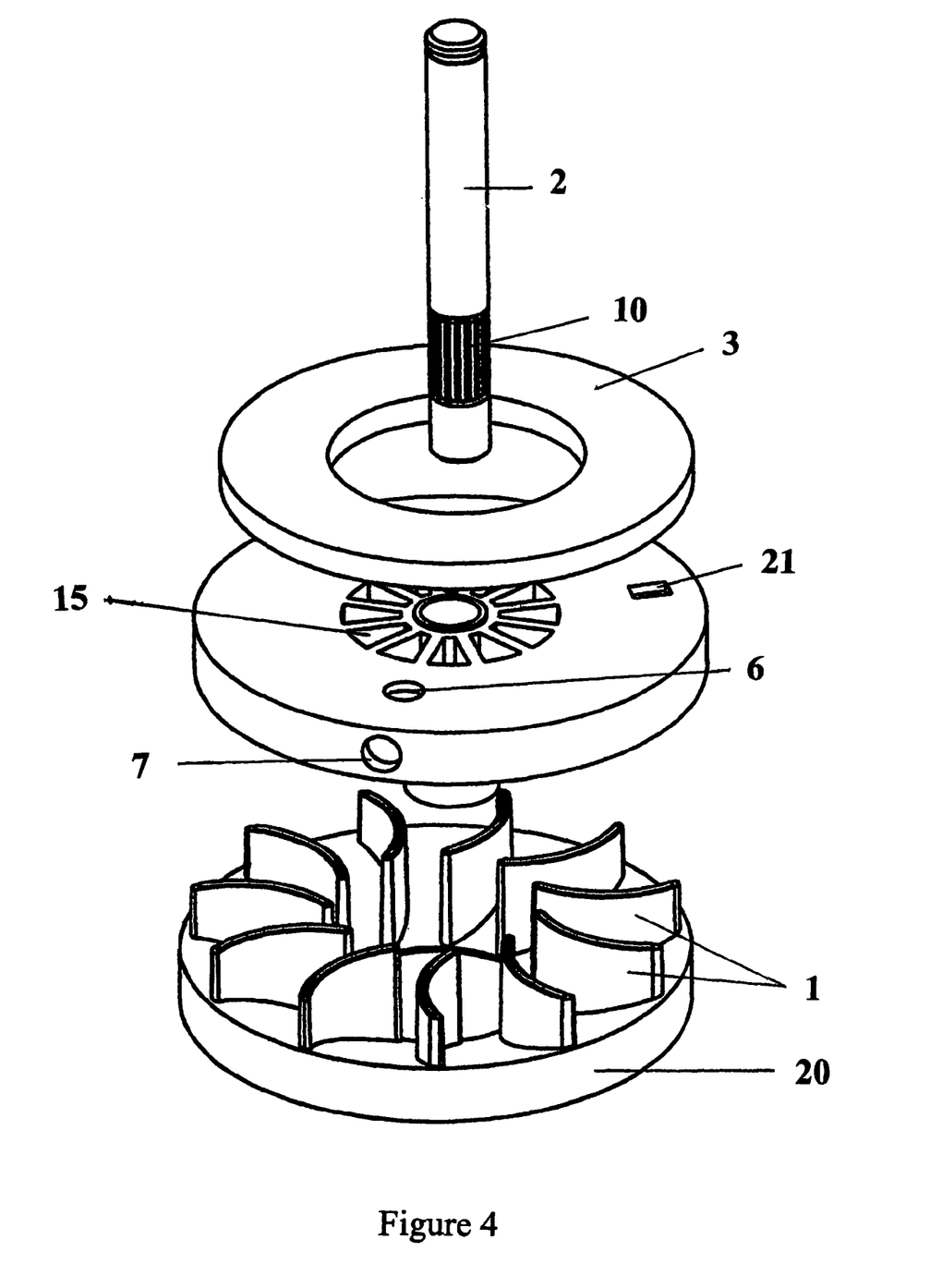
FIG. 4 is an exploded assembly view of an encapsulated rotor according to a second preferred embodiment of the present invention.
Figure 5:
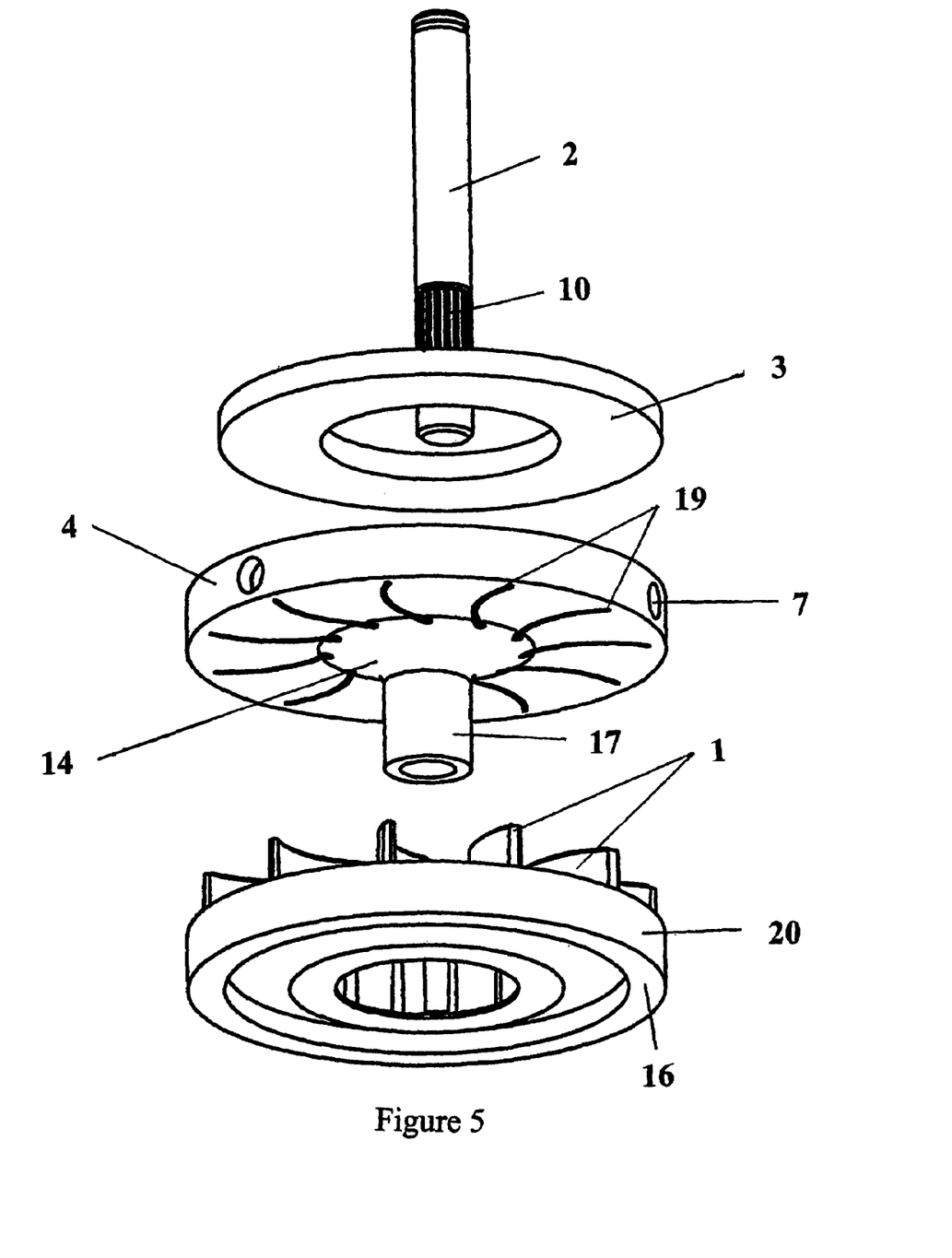
FIG. 5 is an exploded assembly view of the rotor shown in FIG. 4 shown from a different angle.
Figure 6:
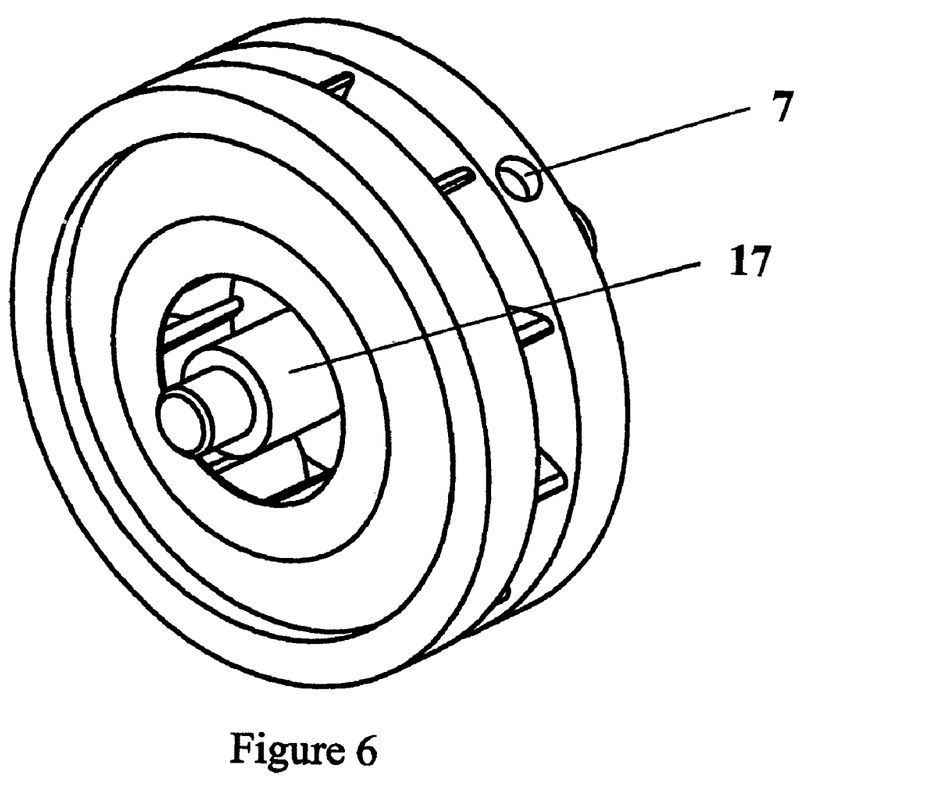
FIG. 6 is a perspective view of an encapsulated rotor according to the second embodiment of the present invention.

With reference to FIGS. 4 to 6 a second preferred embodiment of the present invention will be described. It has been found that a number of advantages can be obtained by including a cap 20 enclosing the upper edges of the impeller vanes. The cap reduces the amount of air spilling over top of the vanes and improves the impeller's performance.

In the second preferred embodiment of the present invention the impeller assembly incorporates a cap enclosing the vanes of the impeller. The additional cap on the impeller blades makes it considerably more difficult to overmould an accurate vane structure in a single operation. FIG. 5 shows an exploded assembly view showing the impeller structure being formed from shaft 2, magnetisable ring 3, rotor body 4 and impeller/end cap ring 20.

The main rotor body 4 is moulded over a one piece magnetisable ring which is magnetised to have four poles. The rotor body has a protruding sleeve portion 17 extending axially from the middle of the disc shaped rotor body. The rotor body has on its upper surface a plurality of shallow grooves 19 spaced around its circumference in order to provide a locating feature for the impeller vanes 1.

The grooves 19 are shaped and positioned so that they may locate the impeller vanes 1 during assembly of the impeller. The upper surface of the vanes 1 may also include a plurality of small ridges (not shown) to aid in ultrasonic welding between the vanes and the grooves. In the second preferred embodiment of the present invention the performance of the impeller is improved by tapering the vanes so that the cross section reduces toward the outside of the rotor body. This feature helps to maintain a more constant pressure and reduces flutter.

The rotor body is manufactured in the manner described above except for manufacture of the one piece impeller of the first embodiment. But the rotor body 4 does not include vanes. In an analogous manner to the first embodiment of the present invention a reference mark 21 is provided on the lower surface of the rotor body 4. While it is possible to locate a reference mark on the top surface of the rotor in the first embodiment of the present invention, the impeller cap 20 of the second preferred embodiment would obscure such a reference mark from the optical sensor. Accordingly in the second preferred embodiment of the present invention the reference mark 21 is located on the underside of the rotor body 4. The reference mark is distinguishable from the detents 6 due to its shape and position closer to the outer edge of the rotor body 4.

It is envisaged that a capped rotor according to the second embodiment of the present invention may be manufactured by adding an end cap to an encapsulated rotor substantially as described in the first embodiment of the present invention. In the most preferred second embodiment of the present invention the impeller vanes 1 are integrally formed with the cap and subsequently welded to the rotor. The method described in the second embodiment of the present invention is most preferred because it provides some advantages during manufacture. Such advantages include:

Mould for rotor body is simpler.

During ultrasonic welding it is preferable that the abutting surfaces to be welded are in the same plane.

Referring to FIGS. 4 to 8, during manufacture an annular magnetisable ring 3 is inserted into the mould cavity 11 so that its bottom surface rests on and is supported by a plurality of rods 12. At least three alignment pins 13 are then inserted through the mould cavity so that they bear upon the outer surface of ring 3 aligning the ring to be coaxial with the central axis of the mould cavity. A shaft 2 is placed into shaft recess 8 which is also aligned with the central axis of the mould cavity. After the mould halves are closed and pressed together molten plastic is injected through injector port 9 until the mould cavity is filled. A sprue is formed in the injector cavity 9 which is later removed when the body of the rotor has cooled. A separate injection moulded part 20 is manufactured which includes the impeller cap and impeller vanes.

In contrast to the first preferred embodiment of the present invention this second embodiment requires further assembly to complete the production of the impeller. The impeller cap 20 is located in the correct position by aligning the impeller vanes 16 with the locating grooves 19 of the rotor body. A welding process such as ultrasonic or vibration welding is then used to bond the two parts together and finish the impeller product.

The benefits obtained from this improved impeller design are:

The same flow pressure can be achieved with a reduced rotational speed or produce a higher pressure for any given rotational speed.

Traditional impeller designs may experience a significant pressure drop at higher flow rates. The improved impeller design is able to produce a more constant pressure throughout a range of flow rates.

The improved impeller design may significantly reduce the level of noise produced by the impeller when operating.

The impeller cap provides a second planar surface spaced apart from the main rotor body. Material may be removed from two planes with maximum axial separation axially which is advantageous for balancing the rotor.

Rotors according to the above embodiments are manufactured in a fashion that leads to accurate tolerancing and minimised imbalance. However in order to improve the dynamic balance of rotors according to the first or second preferred embodiments of the present invention it may be advantageous to perform a dynamic balancing. In order to do this a dynamic balancing apparatus measures the imbalance in two planes and removes appropriate amounts of plastic material from the circumference of the rotor. The removal of material may be effected by a plurality of milling tools, guided by measurements of the imbalance of the rotor. The angular position and the size of each balancing notch formed by the removal of material from the circumference of the rotor counteracts the initial imbalance of the rotor.

Figure 10:
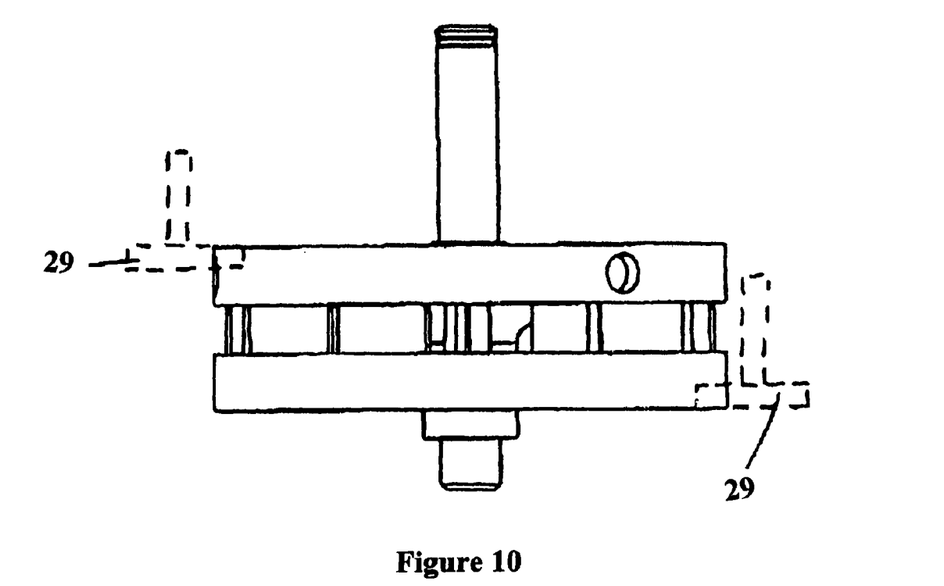
FIG. 10 is a end elevation view of an encapsulated rotor according to the second preferred embodiment of the present invention showing the location of the material to be removed for balancing.
Figure 11:
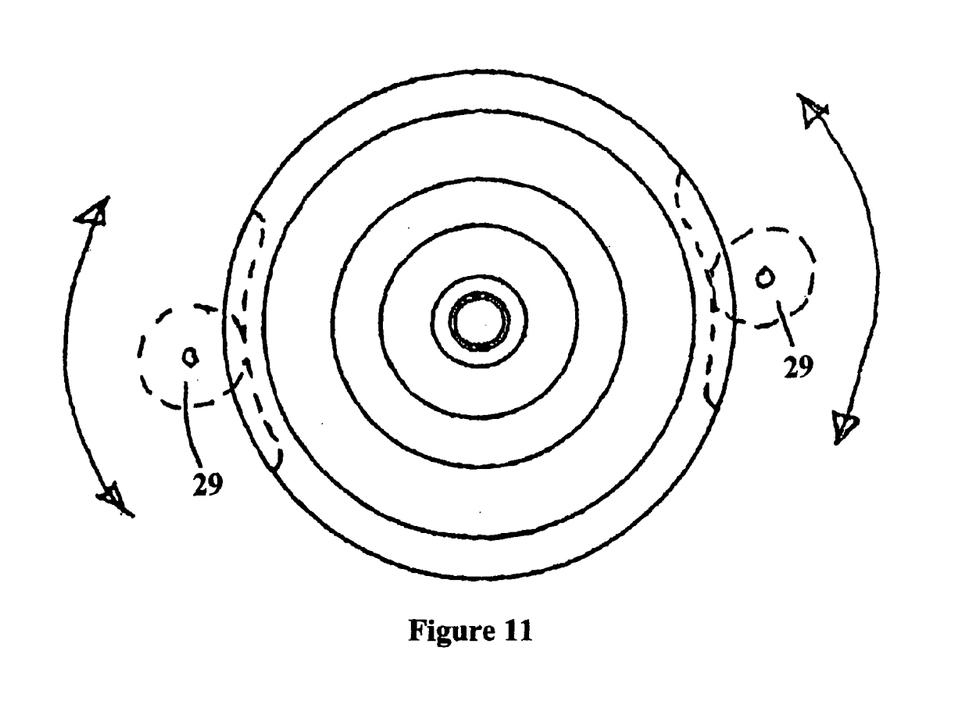
FIG. 11 is a plan view showing the milling paths pictured in FIG. 10.

The wall thickness of the material encapsulating the magnetisable ring 3 is increased around the circumference 34 in order to provide sufficient material which can be removed during the balancing process. Similarly the top surface of the impeller cap 20 is provided with a raised annular ring 16 of plastic material which can be later removed for the purposes of balancing the rotor.

In order for such dynamic balancing to be successful, measurements of the initial imbalance are made from a reference point. The amount of material to be removed in order to balance the rotor is then calculated relative to the same reference point. In removal of material through the milling process position is determined relative to the same reference point for the purpose of accurately removing the material as calculated.

Figure 9:
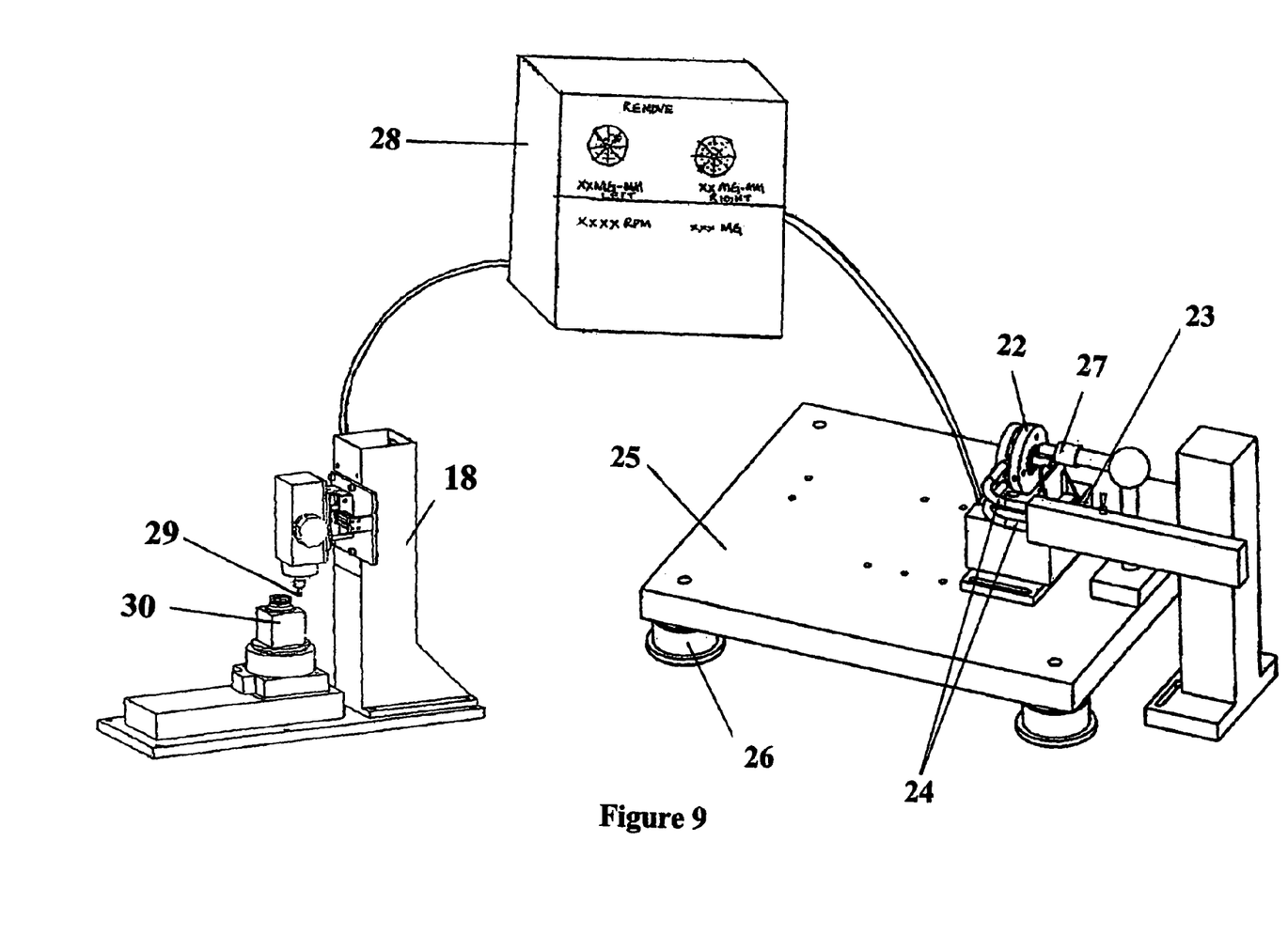
FIG. 9 is a perspective view of the balance measuring apparatus.

In the present invention each impeller includes a reference mark 21, in order to facilitate dynamic balancing of the rotor. FIG. 9 shows a dynamic balancing device. Rotor 22 is rotatably mounted in a holder 23. Air is supplied through conduits 24 and directed onto the impeller vanes in order to spin the rotor. The holder 23 is mounted on a plate 25. The holder includes a plurality of sensors for determining the imbalance of the spinning rotor. In order to reduce interference from environmental vibrations the balancing apparatus is mounted on a solid suspension base which is in turn mounted on vibration isolation mounts 26. An optical sensor 27 is provided in order to sense the reference mark on the rotor as it rotates. A control device 28 receives information from the cradle sensors and the optical sensor.

The control device is programmed to process the signals of the cradle sensors and optical sensor, and determine an imbalance of the rotor relative to the reference mark. The control device is programmed to calculate appropriate material removal that will compensate for the imbalance.

A milling station 18 includes a work piece holder 30 for holding an impeller by its shaft. The work piece holder is driven for precisely controlled angular and translational positioning.

With reference to FIGS. 10 and 11 a cutting tool 29 is spun by the milling machine while the rotor/impeller is moved so that the cutting tool may mill appropriate notches for balancing the rotor as calculated by the balancing machine. The control device calculates the angle, depth and length of the arc to remove the correct mass of material at the correct angular position. In order to orientate the milling machine the same reference mark 21 is orientated to a known position relative to the milling machine.

The rotor is magnetised after the balancing process so that the magnetic field does not interfere with the imbalance measurement. The magnetising process consists of loading the rotor onto a magnetising fixture. The fixture consists of a series of coils wound around a soft magnetic material arranged to produce the appropriate flux pattern to magnetise the ring 3. There is one coil in the magnetising head corresponding to each magnetic pole on the magnetisable ring 3 in the rotor. After the rotor has been loaded onto the magnetising fixture, a bank of capacitors is discharged through the coils in the fixture. This produces an extremely high current pulse of approximately 20,000 amps for 10 microseconds. The magnetic field that is produced is sufficient to permanently magnetise the ring 3.

While a preferred embodiment of the present invention is shown and described, it is envisioned that those skilled in the art may devise various modifications of the present invention without departing from the spirit and scope of the appended claims.

The invention claimed is:

1. A method of manufacturing an impeller comprising the steps of:
   (a) forming an impeller having a plastic disc body and magnetisable material distributed and encapsulated within said body comprising the steps of;
      (i) locating a ring of magnetisable material in an injection mould, including centrally locating said ring by engaging an outer surface thereof at spaced locations around said surface;
      (ii) locating a shaft centrally within said mould, passing through said ring, such that said shaft and said ring have a common axis of rotational symmetry;
      (iii) injecting plastic into said mould to encapsulate said ring of magnetisable material and span between said ring and said shaft;
      (iv) extracting said impeller from said mould;
      (v) forming an annular plastic cap having a lower face and an array of impeller vanes distributed around and extending from said lower face; and
      (vi) securing said cap to an upper face of said disc by connecting the free ends of said vanes to said upper face;
   (b) testing the imbalance of said impeller;
   (c) removing plastic material from said impeller to compensate for said tested imbalance; and
   (d) magnetising said magnetisable material to have an annular array of alternating poles.

2. The method as recited in claimed in claim 1, wherein said step of testing for imbalance includes testing for static imbalance and dynamic imbalance, and said step of compensating for imbalance includes removing plastic material at at least one location on said disc and at least one location on said cap.

* * * * *

UNITED STATES PATENT AND TRADEMARK OFFICE
CERTIFICATE OF CORRECTION

| | | |
|---|---|---|
| PATENT NO. | : 7,210,226 B2 | Page 1 of 1 |
| APPLICATION NO. | : 10/735800 | |
| DATED | : May 1, 2007 | |
| INVENTOR(S) | : Ian Douglas Makinson et al. | |

It is certified that error appears in the above-identified patent and that said Letters Patent is hereby corrected as shown below:

Title Page, Item (75) Inventor: "Subbarao Potharaju" should read

-- Venkata Subbarao Potharaju --

Signed and Sealed this

Eleventh Day of May, 2010

David J. Kappos
*Director of the United States Patent and Trademark Office*